United States Patent [19]
Allen et al.

[11] Patent Number: 5,826,769
[45] Date of Patent: Oct. 27, 1998

[54] MULTI-PURPOSE FOLDING CARRIER

[76] Inventors: Alexander R. Allen; Christopher B. Allen; Gordon R. Allen; Richard A. Allen, all of 29 Devens St., Concord, Mass. 01742

[21] Appl. No.: 756,701

[22] Filed: Nov. 26, 1996

[51] Int. Cl.$^6$ ..................................................... B60R 9/06
[52] U.S. Cl. .......................... 224/497; 224/499; 224/314; 224/555
[58] Field of Search .................... 224/497, 499, 224/523, 524, 528, 549, 555, 560, 314, 511, 42.13

[56] References Cited

U.S. PATENT DOCUMENTS

| | | | |
|---|---|---|---|
| 1,817,056 | 8/1931 | Belgard | 224/514 X |
| 1,828,128 | 10/1931 | Criner | 224/42.26 X |
| 2,777,625 | 1/1957 | Kronhaus et al. | 224/499 X |

FOREIGN PATENT DOCUMENTS

| | | | |
|---|---|---|---|
| 923642 | 2/1955 | Germany | 224/497 |

Primary Examiner—Renee S. Luebke
Attorney, Agent, or Firm—Herbert L. Bello

[57] ABSTRACT

A multi-purpose folding carrier for carrying bulky cargo includes a frame, an upper member rotatably disposed on the frame and a cage rotatably and slidably disposed on the frame, the cage being configured to restrain forward, lateral and rearward movement of cargo placed therein. The upper member and cage are constrained for limited pivotal and/or slidable movement relative to the frame between extended carrying positions and collapsed storage positions. A locking element or brace is provided for securing the upper member in its extended carrying position. A series of straps are provided for securing articles, such as, for example, a cooler, on the cage as well as for securing the carrier to an automobile. The upper member may be provided with a pair of hook members which facilitate fastening the carrier to an externally mounted spare tire. Moreover, lower portions of the frame may be fabricated as a discrete supporting member rotatably mounted on the frame for limited pivotable movement between an extended carrying position and a collapsed storage position.

14 Claims, 11 Drawing Sheets

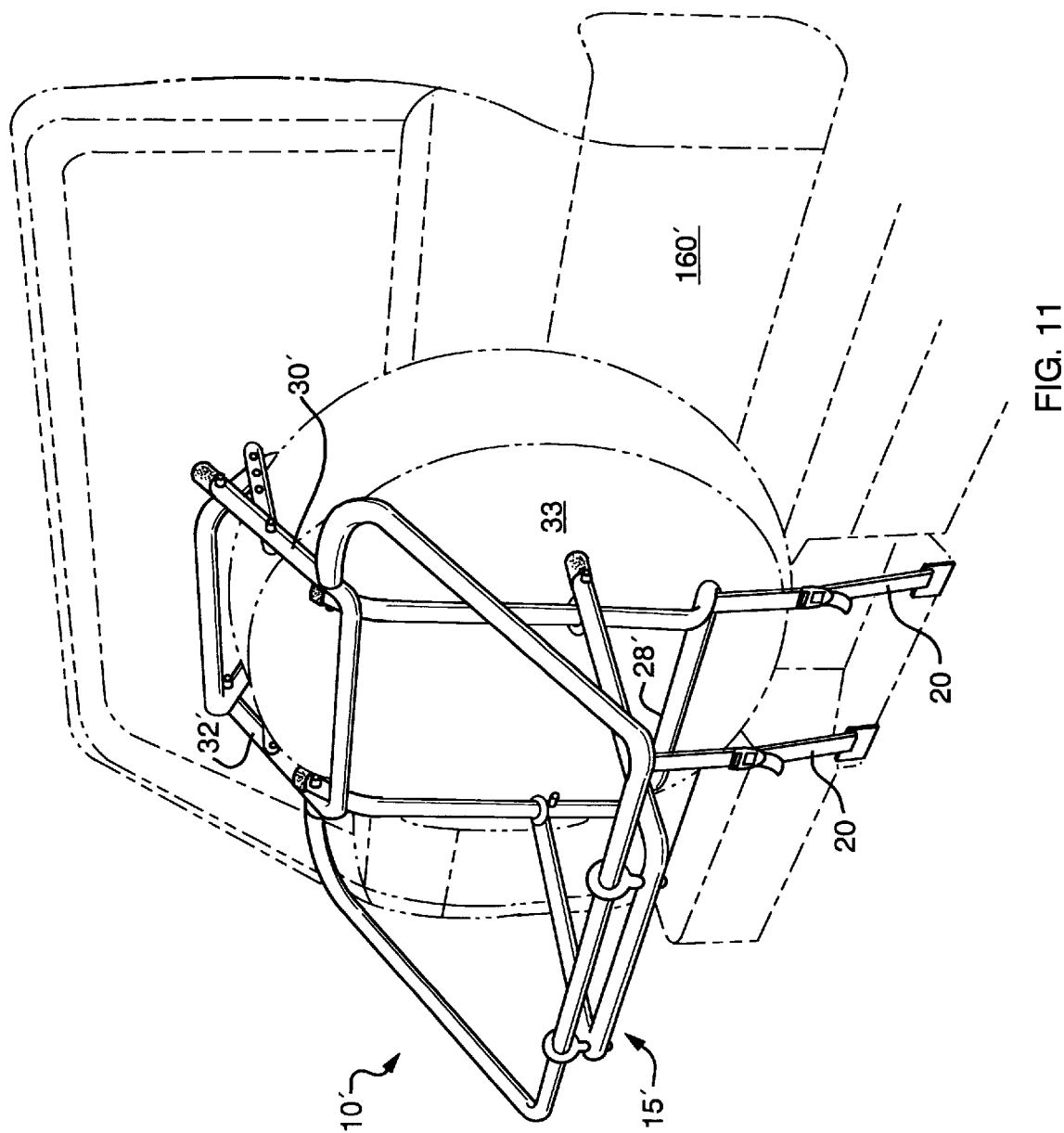

MULTI-PURPOSE FOLDING CARRIER

BACKGROUND OF THE INVENTION

1. Field of the Invention

The present invention relates to carriers that are configured to be attached to motor vehicles, and more particularly, the invention is directed toward a multi-purpose carrier for securing and transporting items such as luggage and coolers on motor vehicles.

2. Description of the Prior Art

A variety of foldable or collapsible bicycle carriers that are configured to be mounted on motor vehicles are available in the prior art. Examples of carriers mountable on automobiles are shown in U.S. Pat. Nos. 4,518,108 and 4,709,840.

In such collapsible carriers, bicycles are carried on a pair of carrying arms rotatably mounted on a frame structure. The carrier is conveniently mounted to the rear portion of the automobile, generally over the automobile's trunk or to a tailgate of a pickup truck. The carrier is secured in place by means of straps. The carrying arms are held in an extended or carrying position and the bicycles are positioned on the extended carrying arms. Advantageously, such carriers may be easily removed from the automobile and conveniently collapsed into a relatively compact configuration for storage. Although such carriers tend to operate efficiently with respect to bicycles, they tend to be ill-suited for carrying relatively bulky items, for example, luggage or coolers. Moreover, such carriers are generally not suited for use on automobiles having a spare tire mounted externally on the automobile's rear hatch or tailgate.

A need has thus arisen for a collapsible carrier that is capable of being conveniently fastened to an automobile for carrying relatively bulky items such as luggage or coolers.

SUMMARY OF THE INVENTION

It is an object of the present invention to provide a folding carrier which does not suffer from the foregoing disadvantages and limitations.

It is another object of the present invention to provide a folding carrier adapted to carry bulky items such as luggage and coolers.

It is a further object of the present invention to provide a folding carrier that can be mounted on vehicles having externally mounted spare tires and is adapted for securely carrying large items such as luggage and coolers.

According to the invention, a folding carrier mountable on an automobile or the like, includes a frame having vehicle engagement members adapted to supportably engage the automobile and a cage rotatably and slidably mounted to the frame. The cage, which is selectively movable between an operative extended position and a collapsed storage position, is adapted to supportably receive and partially surround the cargo to be transported when disposed in its operative extended position.

In an alternate embodiment of the invention, the vehicle engagement members include a pair of arms with hook members disposed on terminal ends thereof. The arms are movably mounted to the frame and adapted for selective movement relative to the frame between an operative extended position and a collapsed storage position. The hook members are adapted to engage an externally mounted spare tire when the pair of arms is disposed in their operative extended positions.

Other general and specific objects, features and advantages of the invention will in part be obvious and will in part appear hereinafter.

BRIEF DESCRIPTION OF THE DRAWINGS

An understanding of the nature and objects of the present invention will become more readily apparent upon consideration of the following detailed description taken in connection with the accompanying drawings, wherein:

FIG. 11 is a view similar to that of FIG. 10, with the carrier mounted on an externally mounted spare tire of an automobile.

DETAILED DESCRIPTION OF THE PREFERRED EMBODIMENTS

Figure 1:
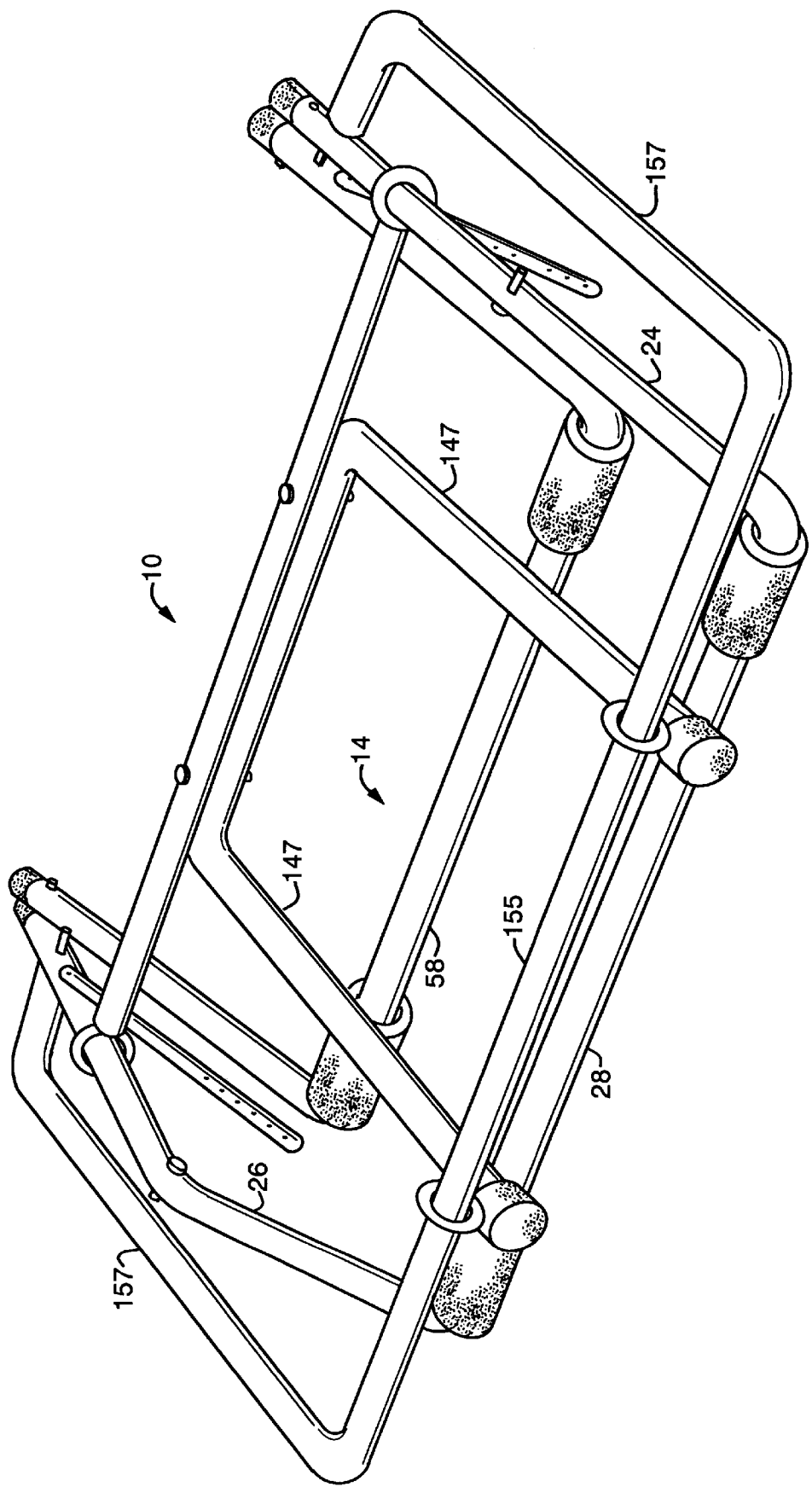
FIG. 1 is a perspective view of a carrier embodying the invention in a collapsed position.
Figure 2:
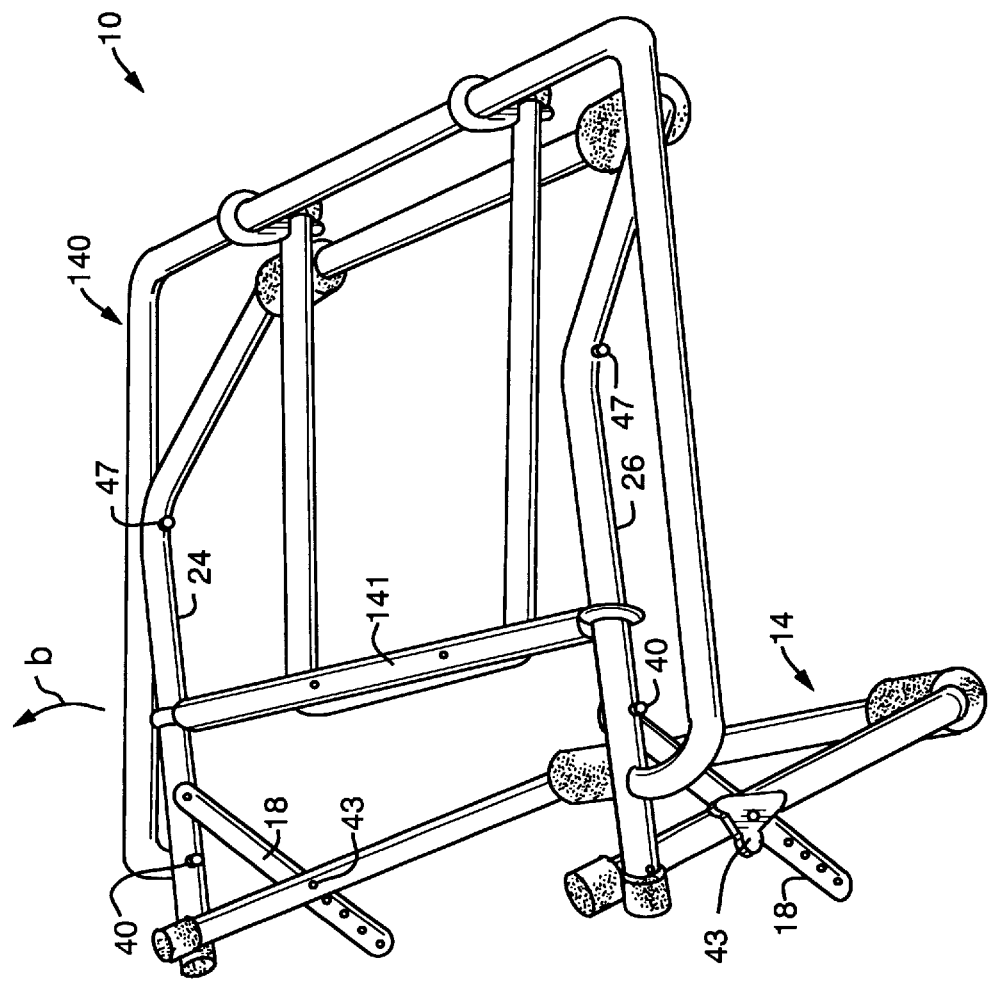
FIG. 2 is a perspective view of the carrier of FIG. 1 in a partially extended position.
Figure 3:
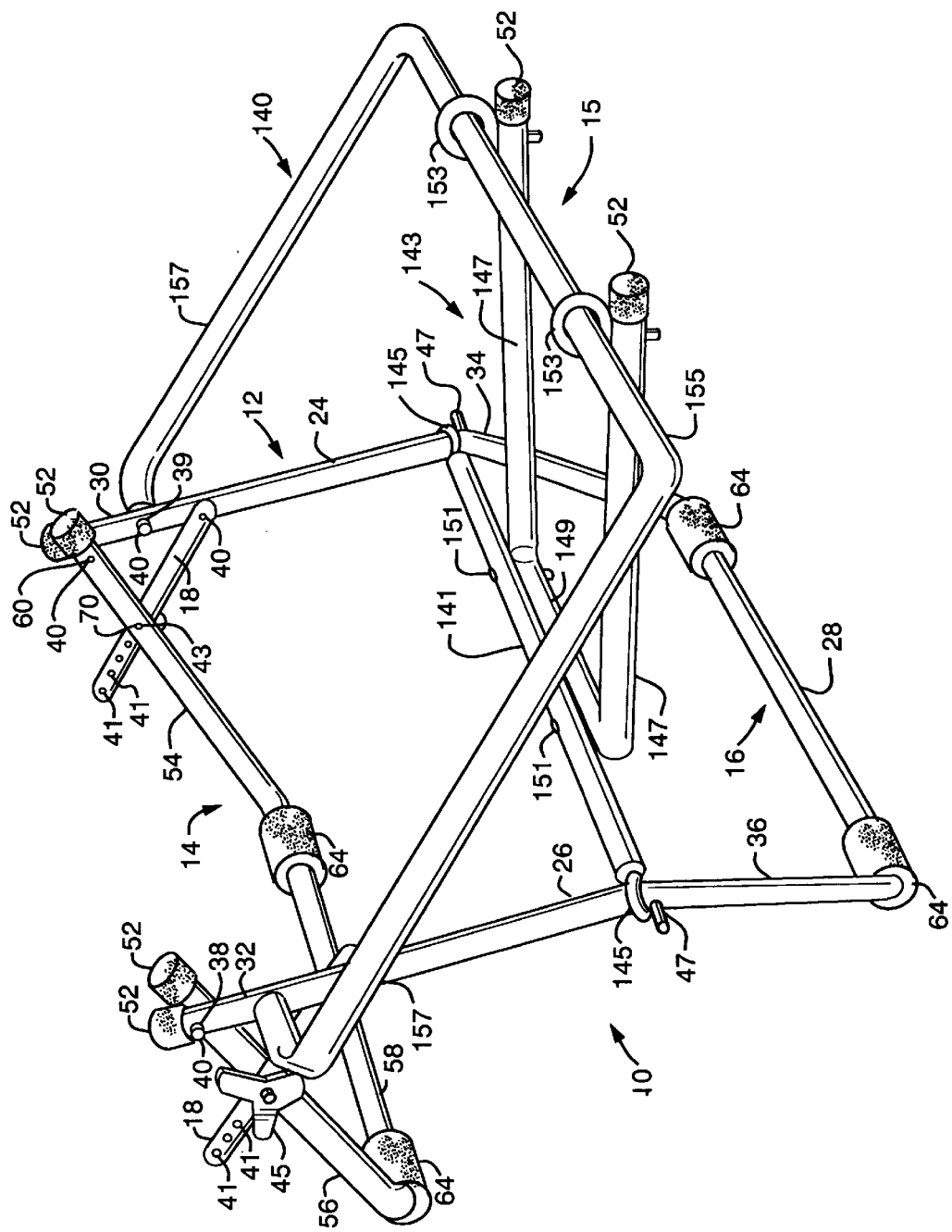
FIG. 3 is a perspective view of the carrier of FIGS. 1 and 2 in a fully extended carrying position.
Figure 4:
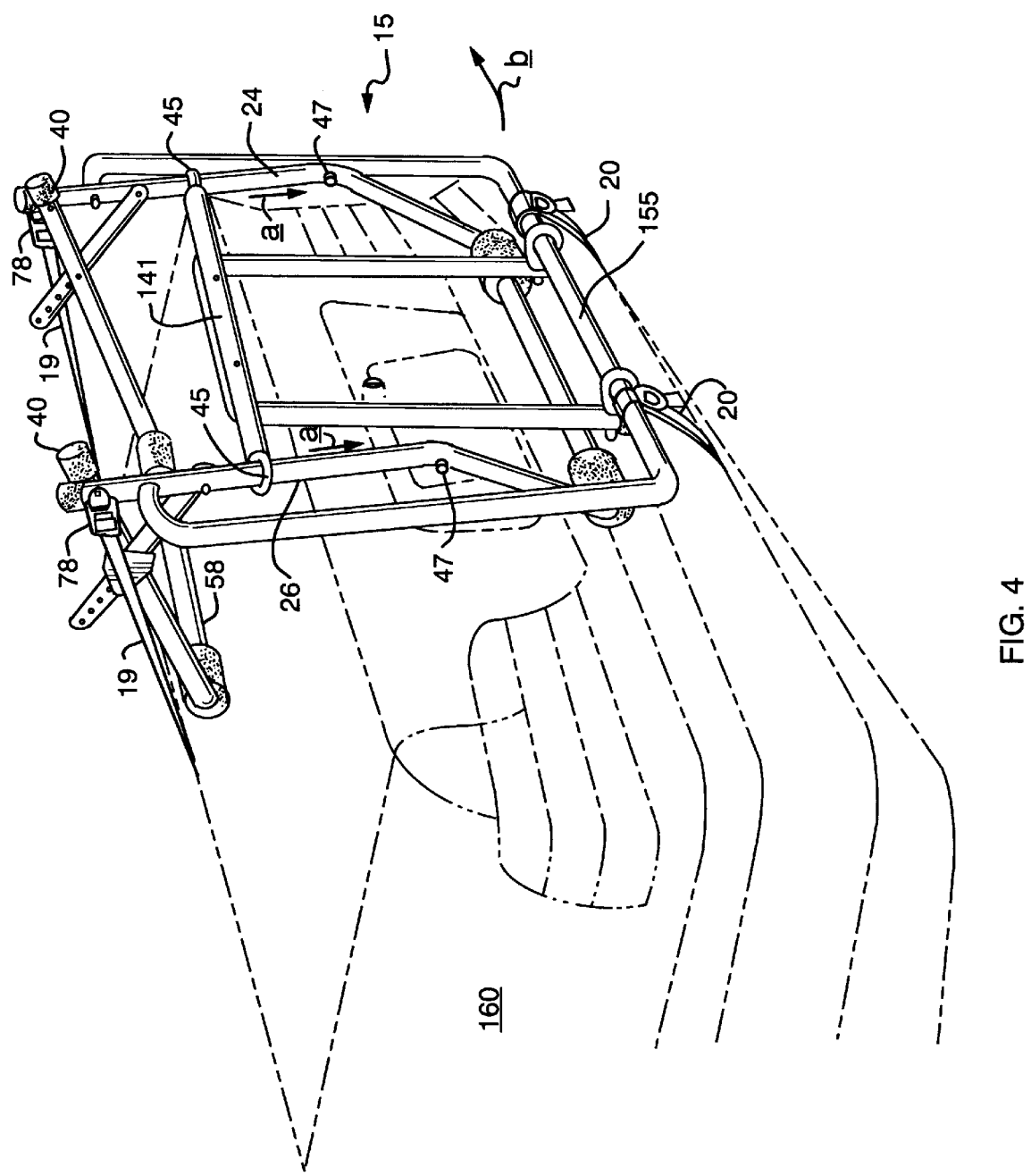
FIG. 4 is a view similar to that of FIG. 2, with the carrier mounted on the trunk of an automobile.
Figure 5:
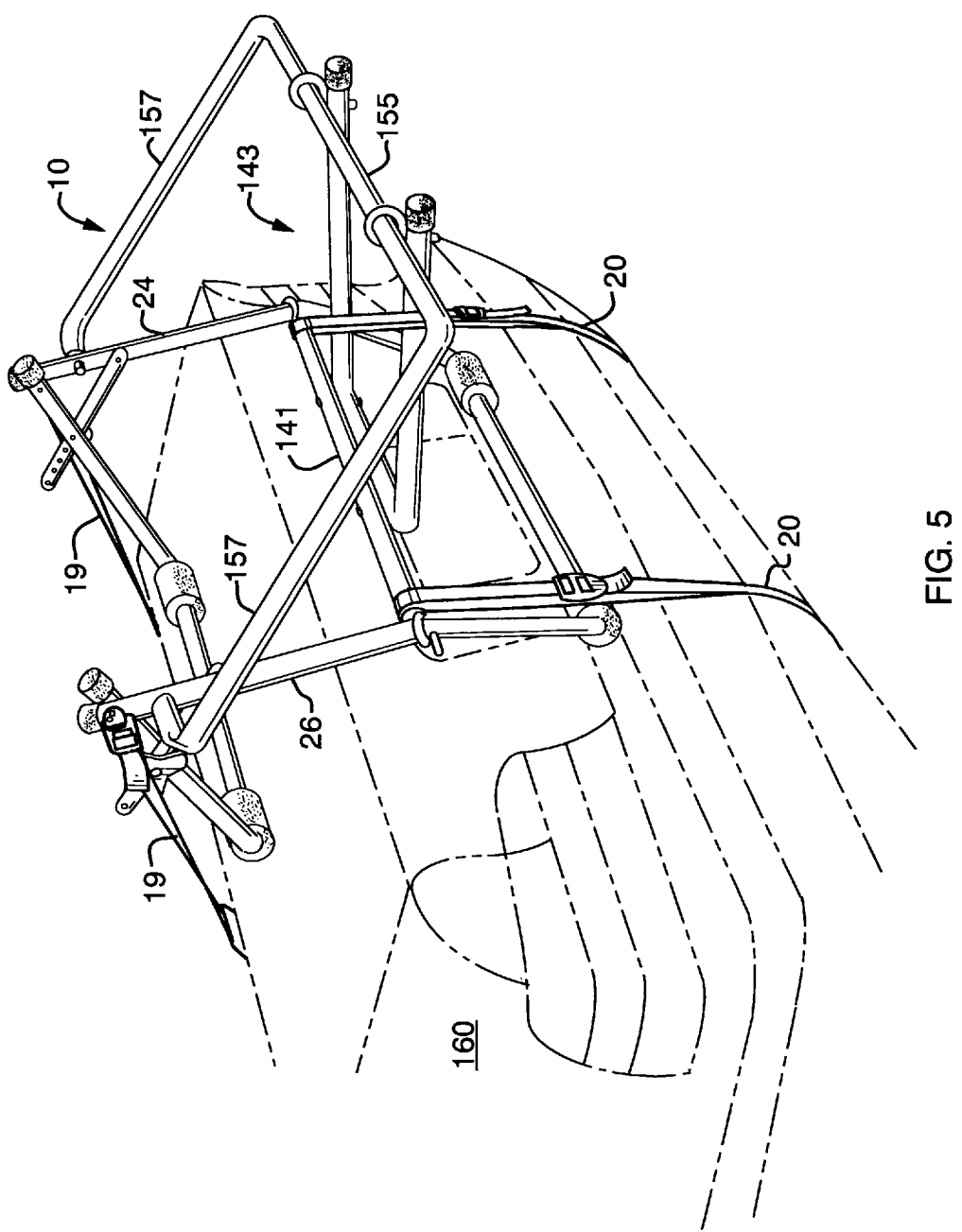
FIG. 5 is a view similar to that of FIG. 3, with the carrier disposed on the trunk of an automobile.
Figure 6:
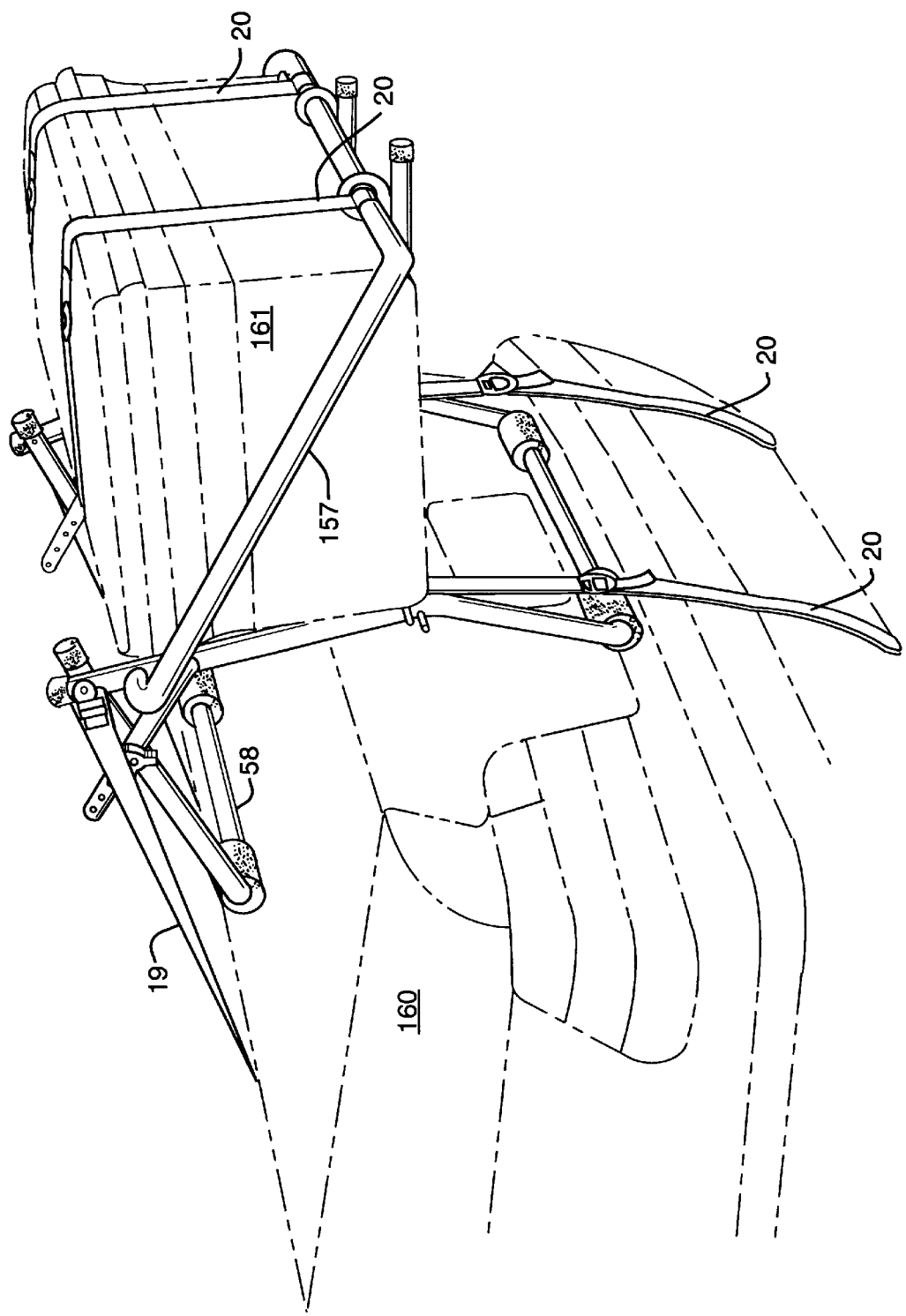
FIG. 6 is a view similar to that of FIG. 5 with a cooler placed in the carrier.

Referring now to the drawings, particularly FIGS. 1–3, there is shown a multi-purpose folding carrier 10 embodying the present invention. Carrier 10 includes a frame 12, an upper foot member 14 rotatably disposed on the frame, a cage 15 rotatably and slidably disposed on the frame, a lower foot member 16 provided at the bottom of the frame. Foot member 14 and cage 15 are constrained for limited pivotal and/or slidable movement relative to frame 12 between extended carrying positions and collapsed storage positions. A locking element or brace 18 is provided for securing upper foot member 14 in its extended carrying position. A series of straps 19 and 20, shown in FIGS. 4–6, are utilized for securing articles positioned in and supported by cage 15, for example, a cooler 21 (FIG. 6), in the cage as well as for securing carrier 10 to an automobile 160.

Figure 7:
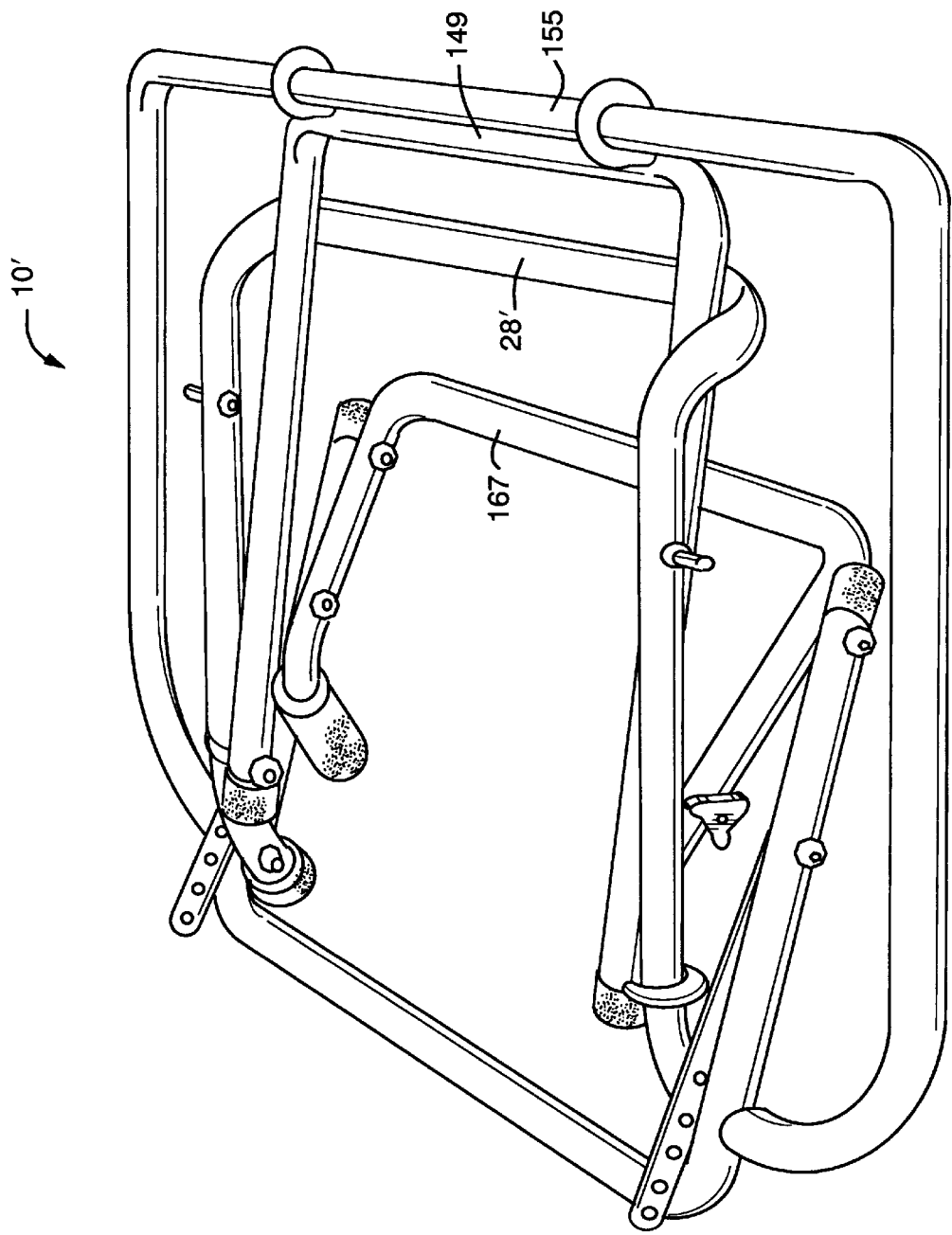
FIG. 7 is a perspective view of an alternate embodiment of the carrier of the present invention, in its collapsed position.
Figure 8:
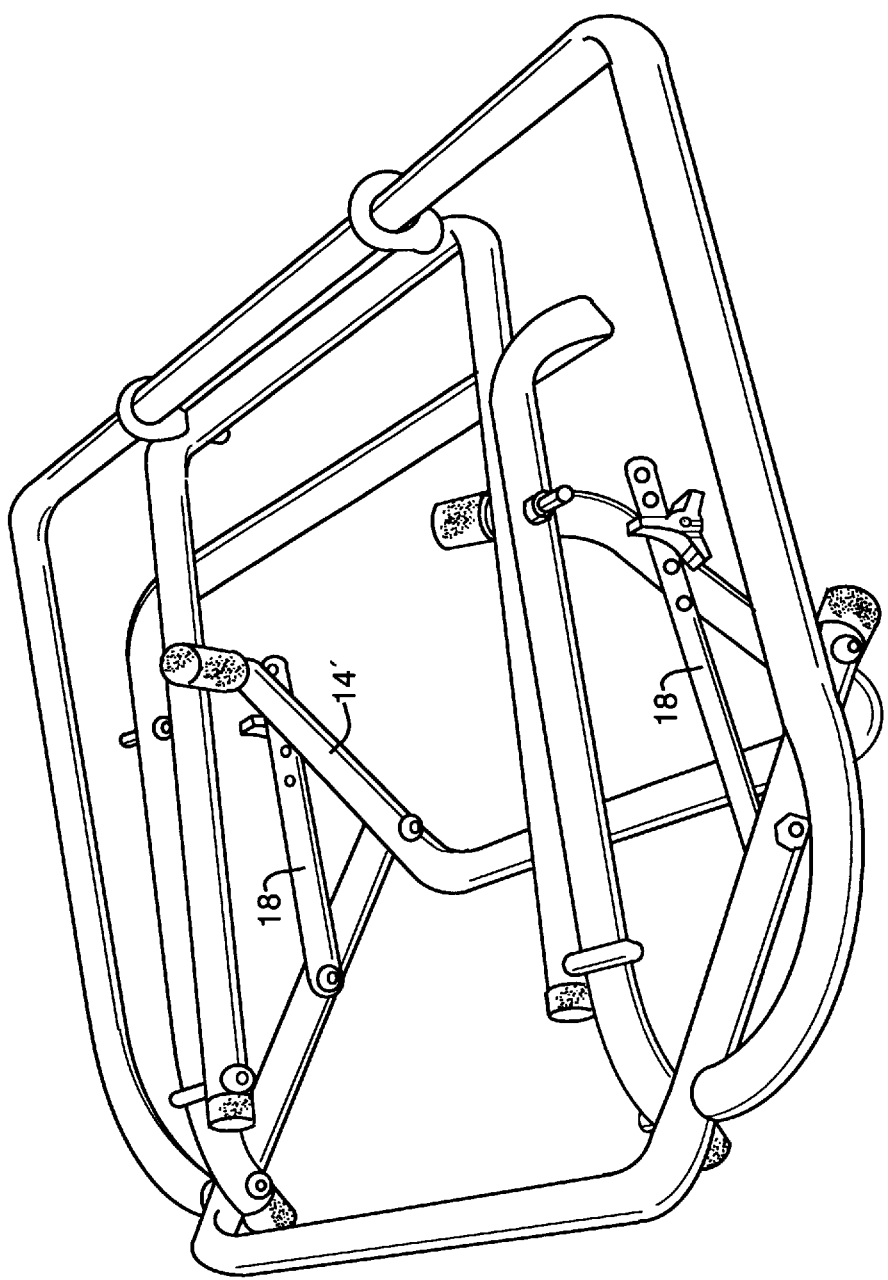
FIG. 8 is a perspective view of the carrier of FIG. 7 haven been moved toward an extended carrying position.

In an alternative embodiment, shown in FIGS. 7–11, a carrier 10' has an upper foot member 14' that is provided with a pair of hooks or clamping members 29 that facilitate fastening the carrier to an externally mounted spare tire 33 (FIG. 11). Moreover, lower portions 34' and 36' of frame 12 may be fabricated as a discrete supporting member 16 rotatably mounted on frame 12 for limited pivotable movement between an extended carrying position (FIGS. 9 and 10) and a collapsed storage position (FIGS. 7 and 8).

For explanatory purposes, throughout this disclosure, the terms upper, lower, forward and rearward shall refer to directions relative to the present invention when operatively placed in its extended carrying position on an automobile.

As shown in FIGS. 1–3, and with particular reference to FIG. 3, frame 12 is a substantially U-shaped member having a pair of legs 24 and 26 and an integral cross member 28.

Legs 24, 26 and cross member 28 are of sufficient size to provide mechanical support for cage 15. Leg 24 has an upper portion 30 and a lower portion 34. Leg 26 has an upper portion 32 and a lower portion 36. Each of the upper portions 30 and 32 includes an aperture 38 that is sized to receive a pin, bolt or other fastener 40 which rotatably connects the frame 12 to member 14. Apertures 38 are preferably positioned proximate upper ends of upper portions 30 and 32. As shown, upper portions 30 and 32 also each include an aperture 39 disposed proximate aperture 38 and adapted to receive a pin, bolt or other fastener 40 which rotatably connects frame 12 to terminal ends of a perimeter rail 140 of cage 15 as will be discussed in greater detail hereinafter. Apertures 38 and 39 are positioned so as to form two parallel axes of rotation. In an alternative embodiment, member 14 and perimeter rail 140 may both be fastened to frame 12 through apertures 38 as shown in FIGS. 7–11, which will also be discussed in greater detail hereinafter.

A pin or stop 47 extends orthogonally from a predetermined location along the length of each leg 24 and 26 to limit slidable movement of a slide bar 141 along legs 24 and 26. Pins 47 thus define a limit of a predetermined range of movement of slide bar 141 relative to legs 24 and 26 as shown in FIGS. 2 and 3. Each leg 24 and 26 is also preferably provided with a bend, preferably proximate pins 47, so that lower portions 34 and 36 of the legs extend at predetermined oblique angles relative to upper portions 30 and 32, respectively and form lower foot member 16. A first pair of feet 64 fabricated from, for example, rubber, are positionable on integral cross member 28 to facilitate engagement with an automobile as will be discussed hereinafter. Legs 24 and 26 are spaced a predetermined distance from one another which is preferably greater than the length of both U.S. and European vehicular license plates so as not to obstruct the view thereof when the carrier is installed in its extended carrying position on vehicle 160 as shown in FIGS. 5 and 6. The distance between legs 24 and 26 is preferably approximately 30 inches. Frame 12 may be manufactured from virtually any strong durable material, such as aluminum, steel, polymeric plastic or composite materials. In the preferred embodiment, frame 12 is fabricated from aluminum tubing.

Frame 12 also includes a pair of locking elements or braces 18 which may be of any suitable construction capable of selectively maintaining member 14 in a rigid orientation relative to the frame. As shown in FIG. 3, each brace 18 is an elongated member, one end of which is rotatably connected to an inner surface of upper portions 30 and 32, respectively, of leg 24 by a suitable fastener 40. The other end of each brace 18 is fastenable through one of a series of apertures 41 disposed therein, to member 14 using a pin, bolt or other fastener 43. One skilled in the art will recognize that use of a series of spaced apertures 41, as shown, may be utilized to provide a predetermined range of adjustability of member 14 relative to frame 12. This range of adjustability serves to enable carrier 10 to be installed on automobiles 160 of varying configurations, while maintaining a platform member 143 of cage 15 in a substantially horizontal position when carrier 10 is in its extended carrying position, as will be discussed hereinafter. As also shown, each fastener 43 may preferably be equipped with an enlarged head 45 to facilitate manual operation thereof without the use of tools. A protective cap or boot 52 also composed of, for example, plastic or rubber, may also be used to cover the ends of the frame 12, as well as ends of member 14 and platform member 143 of cage 15, which will also be discussed in hereinafter.

Member 14 is mounted on frame 12 such that it can be rotated between its extended carrying position as shown, and a collapsed storage position (FIG. 1). In the carrying position, member 14 is oriented substantially perpendicularly to frame 12. In the storage position, member 14 and frame 12 are in substantially parallel, side-by-side relationship. Member 14 is a substantially U-shaped member comprising a pair of arms 54 and 56 integral with a front foot bar 58. Arms 54 and 56 each have an aperture 60 for receiving fastener 40 which rotatably connects the member 14 to the frame 12. Arms 54 and 56 also each include an aperture 70 to facilitate engagement with brace or locking element 18. Member 14 is typically formed of materials similar to that of frame 12, preferably aluminum tubing. A second pair of feet 64 are disposed on front foot bar 58. When carrier 10 is mounted on a vehicle 160, as shown in FIGS. 4–6, feet 64 provide a non-slip contact surface that prevents scratching of the finished surface of the vehicle 160 as a result of contact between it and carrier 10.

Cage 15 includes perimeter rail 140, slide bar 141 and platform member 143. Slide bar 141 includes an engagement means 145 disposed at opposite ends thereof, which serve to slidably and rotatably fasten slide bar 141 to legs 24 and 26 to facilitate sliding and rotatable movement of slide bar 141 relative to the legs. In a preferred embodiment as shown, engagement means 145 comprise conventional eye bolts having a predetermined diameter capable of slidably and concentrically interfitting with legs 24 and 26 as shown. The eye bolts are rotatable relative to slide bar 141 to permit the slide bar to rotate about its longitudinal axis during the sliding movement along legs 24 and 26, to facilitate rotatable movement of cage 15 as will be discussed hereinafter. Alternatively, engagement means 145 may include using any suitable construction such as a key (not shown) disposed on either end of slide bar 141 adapted to interfit with rails (not shown) extending along the lengths of the legs.

Platform member 143 is of a generally U-shaped construction similar to that of member 14 and includes a pair of arms 147 that extend from an integral base 149. However, arms 147 are placed at a predetermined distance from one another substantially closer than that of arms 54 and 56 to facilitate supportive engagement with a variety of loads, such as luggage, a cooler, etc., as will be discussed in greater detail hereinafter. As shown, base 149 is rigidly fastened in a superimposed manner, preferably beneath, slide bar 141 at a position nominally centrally disposed between legs 24 and 26. This fastening may be accomplished by any convenient fastening means, such as, for example, a pair of nut and bolt fasteners 151 as shown. Terminal ends of arms 147 are rotatably fastened to a base portion 155 of the perimeter rail, which, as shown, is disposed substantially parallel to slide bar 141. The terminal ends are fastened to base portion 155 by any suitable means such as by conventional eye bolts 153 of the type described hereinabove with respect to engagement means 145. As shown, arms 147 are preferably fastened directly beneath base portion 155 of platform member 143. In this manner, slide bar 141 and base portion 155 serve as lips to help prevent cargo placed on platform member 143 from sliding off the platform member in the forward or rearward directions during operation of automobile 160, as will be discussed in greater detail hereinafter.

Perimeter rail 140 is a generally U-shaped member, similar in many respects to platform member 147 and member 14, having side rails 157 which extend orthogonally from base portion 155. Terminal portions 159 of side rails 157 extend orthogonally therefrom, in a direction substantially parallel to base portion 155, towards frame 12 to engage fasteners 40 extending through apertures 39 to facilitate rotation of perimeter rail 140 about the axis defined by apertures 39 as discussed hereinabove. This orthogonal disposition of terminal portions 159 thus serves to enable side rails 157 to be disposed at a predetermined distance from one another, which, as shown, is substantially greater than the distance between legs 24 and 26. Such construction serves to facilitate carrying items having dimensions greater than the distance between legs 24 and 26. Thus, legs 24 and 26, in combination with slide rail 141, serve to restrain forward movement, while side rails 157 restrain lateral or side-to-side movement and base portion 155 restrain movement in the rearward directions of cargo placed on platform member 143 as shown in FIG. 6. Other dimensions of cage 15, such as lengths of side rails 157 and arms 147 of platform member 143, are predetermined in conjunction with the dimensions of frame 12, so that platform member 143 is substantially perpendicular to frame 12 when the carrier is disposed in its extended carrying position on automobile 160 as shown in FIG. 5 and 6. This orientation will serve to help maintain platform member 143 in a generally horizontal orientation when carrier is disposed in its extended carrying position on automobile 160, as will be discussed in greater detail hereinafter.

Referring now to FIGS. 4–6, a series of straps 19 and 20 are utilized to secure carrier 10 to automobile 160. As shown in FIG. 4, a strap 19, preferably manufactured from nylon, is attached to each leg 24 and 26 for connection in a conventional manner between frame 12 and the trunk lid of automobile 160. In this regard, in order to attach strap 19, a conventional buckle 78 may be affixed to each of the legs by fasteners 40. Straps 19 may then be threaded through the buckles and fastened thereto using techniques familiar to those skilled-in-the-art. Straps 19 are sized so that they have the requisite strength for securing a fully laden carrier 10 to vehicle 160. Straps 19 are unnecessary when utilizing the alternate embodiment shown in FIGS. 7–11 and which will be discussed hereinafter.

As shown in FIG. 4, a pair of lower straps 20 which are substantially similar to straps 19, may be looped around base portion 155 of perimeter rail 140 and fastened in any convenient manner to a lower portion of automobile 160, such as to the bumper or conventional tie-down points located beneath the bumper. Straps 20 will thus serve to maintain carrier 10 in its partially extended position as shown and as will be discussed hereinafter with regard to the operation of the present invention.

As shown in FIG. 5, lower straps 20 may be moved from base portion 155 to slide bar 151 to secure carrier 10 when cage 15 is in its extended carrying position as shown. Referring to FIG. 6, an additional pair of straps 20 are preferably fastened between base portion 155 and slide member 151, and around cargo, such as a cooler 161, to further secure the cargo to carrier 10.

Referring now to FIGS. 7–11, an alternate embodiment of the present invention is shown as carrier 10'. Where components of carrier 10' are substantially identical to those of carrier 10, identical reference numbers distinguished by a prime notation will be used. Similar components will utilize similar reference numbers.

Figure 10:
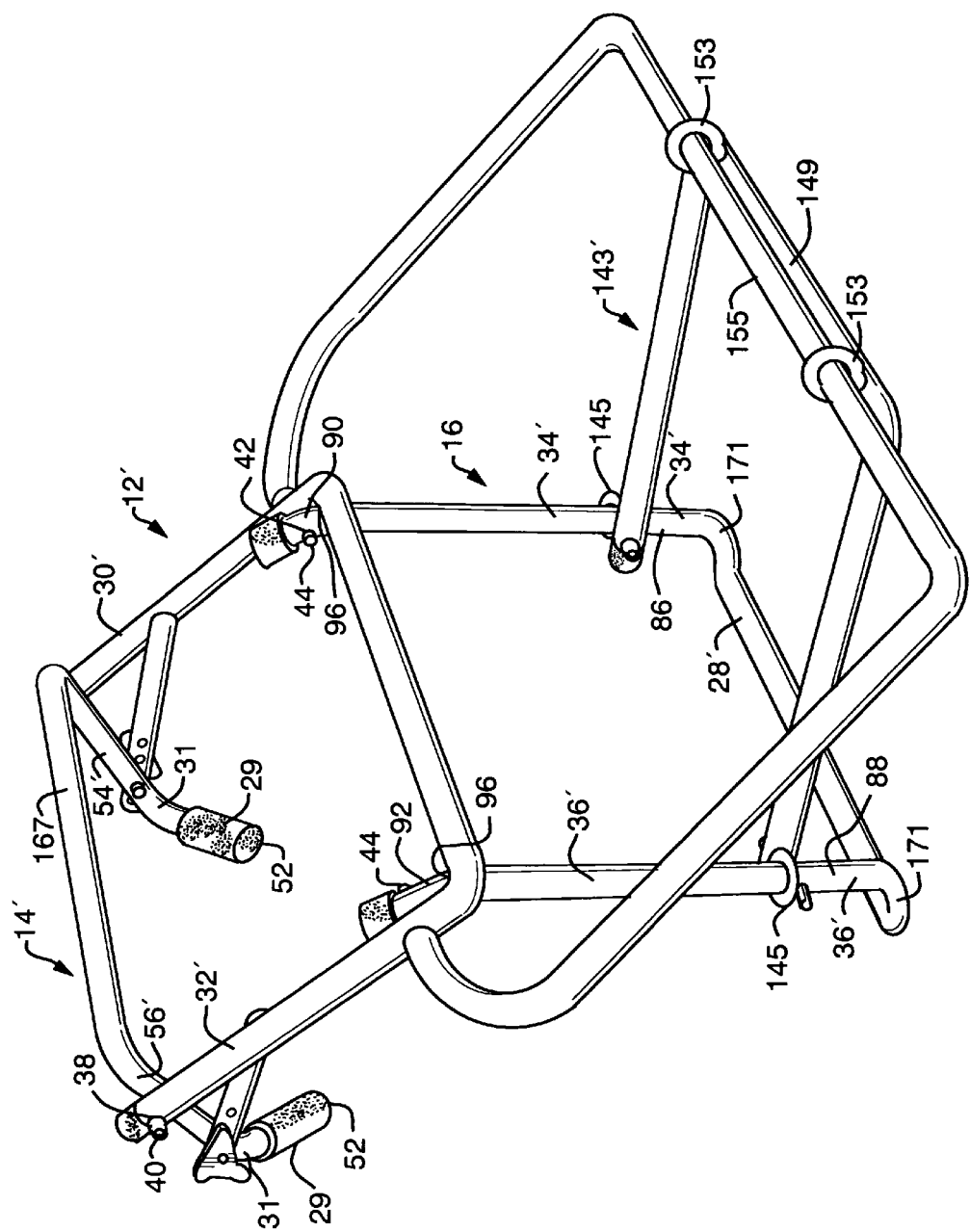
FIG. 10 is a perspective view of the carrier of FIGS. 7–9 in its fully extended carrying position.

As best shown in FIG. 10, in lieu of foot bar 58, member 14' includes a pair of clamping or hook members 29 formed by bends 31 proximate terminal ends of arms 54' and 56'. These discrete hook members serve to facilitate secure engagement of carrier 10' to an externally mounted spare tire 33 (FIG. 11) of vehicle 160'. In this regard, lack of any direct connection between hook members 29, such as by foot bar 58 described hereinabove, serves to enable a user to selectively install and remove member 14' to and from tire 33 with relative ease. Arms 54' and 56' and upper portions 30' and 32' are spaced a predetermined distance from one another which is less than the diameter and preferably greater than one third the diameter of spare tire 33. This spacing serves to enable the arms and upper portions to engage the tire at optimally spaced locations along the circumference of tire 33 as shown in FIG. 11 and as will be discussed hereinafter with respect to the operation of the present invention.

To provide desired structural rigidity to member 14', an integral connection member 167 serves to connect arms 54' and 56' proximate apertures 60 thereof. As also shown, caps 52 are preferably placed over hook members 29 for protective purposes.

Referring now to FIG. 11, cross-member 28 is adapted to rest on spare tire 33, rather than directly on the surface of vehicle 160', thus eliminating the need for feet 64. As shown, lower portions 34' and 36', respectively, are provided with a pair of bends 171 at their interface with crossmember 28 which serve to offset cross-member 28 a predetermined distance from the lower portions. This offset effectively replaces the offset otherwise provided by feet 64 to help eliminate any tendency of platform member 143 to bind or interfere with spare tire 33 during sliding movement relative to lower portions 34' and 36'. In this regard, as shown, platform member 143 is inverted 180 degrees relative to the orientation thereof on carrier 10, so that base 149 is fastened by eyes 153 to base portion 155 of perimeter rail 140, with eyes 145 being fastened directly to terminal ends of arms 147. This inversion of platform member 143 serves to eliminate the need for slide bar 141, thus advantageously relatively lowering the number of parts and overall material cost of the carrier. The skilled artisan will recognize that platform member 143 may be similarly inverted on trunk mounted carrier 10 as described hereinabove to achieve substantially similar benefits.

As also shown in FIGS. 7–11, rather than being disposed integrally with upper portions 30' and 32', lower portions 34' and 36' of frame 12' may be fabricated as a discrete supporting member 16 rotatably mounted on frame 12' for limited pivotable movement between an extended carrying position (FIGS. 9–11) and a collapsed storage position (FIGS. 7 and 8). In particular, as best shown in FIG. 10, supporting member 16 may be fabricated as a substantially U-shaped member including lower portions 34' and 36' extending integrally from cross-member 28'. Lower portions 34' and 36' each include an aperture 42 sized to receive a pin, bolt or other fastener 44 which rotatably connects supporting member 16 to frame 12'. Apertures 42 are thus positioned so as to form an axis of rotation substantially parallel to that of apertures 38.

Lower portions 34' and 36' have substantially straight body portions 86 and 88 and upper portions 90 and 92, respectively. Upper portions 90 and 92 extend obliquely from body portions 86 and 88. A protective cap or boot 52 is fitted over the end of upper portions 90 and 92. Stop elements 96 are defined by bends at the junctions of body portions 86 and 88 and upper portions 90 and 92, respectively. Stop elements 96 restrict and limit the rotational movement of supporting member 16 relative to frame 12 to maintain supporting member 16 at a predetermined angular position relative to frame 12 when carrier 10 is moved to its extended carrying configuration from its storage position. Supporting member 16 is preferably manufactured from the same material as frame 12, such as, for example, aluminum tubing.

It should be understood by those skilled in the art that the discrete supporting member 16 shown and described hereinabove may be utilized in either trunk mounted or tire mounted embodiments without departing from the spirit and scope of the present invention.

Preferred embodiments of the present invention having been fully described, the following is a description of the operation thereof.

In operation, carrier 10 is moved from its collapsed storage position (FIG. 1) to its partially extended position by pivoting member 14 into position as shown in FIG. 2, adjusting locking element 18 and then securing locking element 18 in place by tightening fastener 43. In particular, member 14 is pivoted until it is disposed at a desired orientation within its range of adjustability relative to frame 12. As discussed hereinabove, the desired orientation is one that maintains platform member 143 in a substantially horizontal position when carrier 10 is in its extended carrying position on automobile 160.

Once member 14 is in position, carrier 10 can be positioned on the trunk of a vehicle 160 as shown in FIG. 4. Carrier 10 is then secured in position on vehicle 160 using straps 19 and 20 as described hereinabove. As shown, a pair of straps 20 may be fastened to base 155 of the perimeter bar to conveniently maintain cage 15 in its collapsed position to facilitate transportation of carrier 10 when cargo is not being carried.

When cargo is to be carried, lower straps 20 may be unfastened and slide bar 141 moved through its predetermined range of movement relative to arms 24 and 26, in the direction indicated by arrows a, until eyes 45 engage pins or stops 47. This movement will, in turn, serve to rotate perimeter rail 140 about fasteners 40, in the direction indicated by arrow b, to move cage 15 into its operational or extended carrying position as shown in FIG. 5. Locking element 18 may be further adjusted as necessary to optimize the orientation of the platform as described hereinabove. Lower straps 19 are then refastened to slide bar 141 to maintain carrier 10 and cage 15, including platform member 143, in their extended positions. Cargo, such as cooler 161 (FIG. 5) may then be loaded on carrier 10 and fastened with additional straps 20 as also discussed hereinabove.

Figure 9:
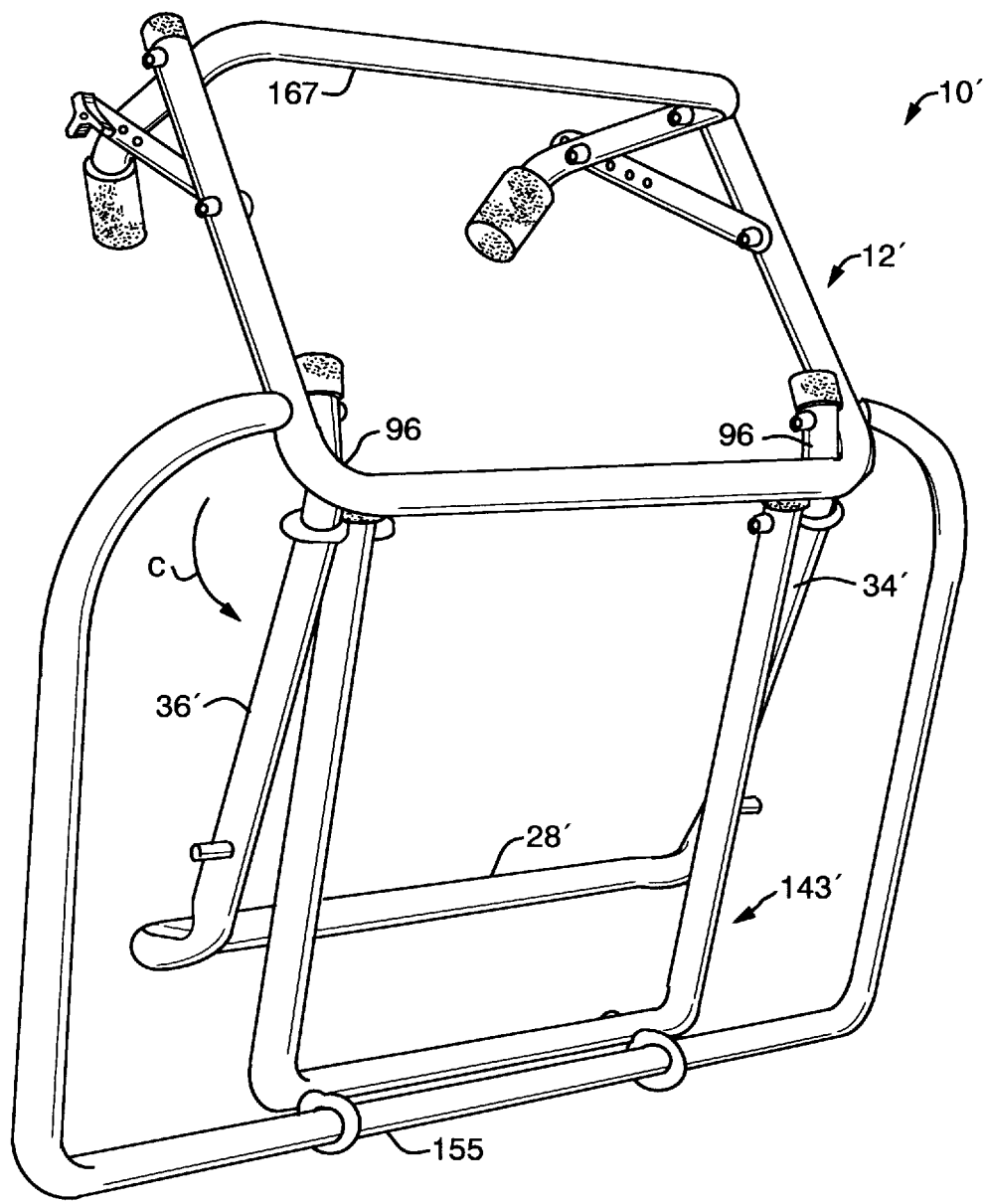
FIG. 9 is a perspective view of the carrier of FIGS. 7 and 8 haven been moved further toward the extended carrying position.

Carrier 10' is operated in a substantially similar manner as carrier 10. In particular, carrier 10' is moved from its collapsed storage position (FIG. 7) by pivoting member 14' into position as shown in FIG. 8 and securing each locking element 18. Supporting member 16 is similarly pivoted in the direction of arrow c (FIG. 9) until stop elements 96 contact frame 12' so that supporting member 16 is disposed at its predetermined, preferably oblique orientation relative to frame 12', as shown in FIG. 9. Once member 14' and supporting member 16 are so disposed, as shown in FIG. 11, carrier 10' may be positioned on externally mounted spare tire 33 of an automobile 160' by placing clamp or hook members 29 over spare tire 33 between the spare tire and automobile 160'. As mentioned hereinabove, arms 54' and 56', as well as upper portions 30' and 32' of the legs will rest at optimally spaced locations on the circumference of the tire to maintain carrier 10' thereon. Moreover, as shown, a portion of the tire will extend upwards between upper portions 30' and 32' to help maintain carrier 10' in substantially centered relation thereon. Carrier 10' is secured to vehicle 160' by a pair of straps 20 fastened as described hereinabove. These straps, in combination with the above described engagement with tire 33 thus advantageously serve to provide relatively secure mounting to automobile 160' without the necessity of employing any straps 19 to the upper portions of frame 12'. Such construction advantageously provides for relatively simple installation. While secured to automobile 160', cage 15' may be moved between its extended carrying position as shown in FIG. 11 and its collapsed position, in substantially the same manner as described hereinabove with respect to cage 15.

It should be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

What is claimed is:

1. A folding carrier mountable on a motor vehicle, said carrier comprising:

a frame having a plurality of vehicle engagement members adapted to supportably engage the motor vehicle, said vehicle engagement members including at least an upper foot member means movably disposed on said frame, said upper foot member means being selectively movable between an operative extended position and a collapsed storage position; and a cage rotatably and slidably disposed on said frame, said cage being selectively movable between an operative extended position and a collapsed storage position, said cage being adapted to supportably receive and restrain cargo placed therein when said cage is disposed in said operative extended position.

2. The folding carrier of claim 1, further comprising bracing means disposed on said frame, said bracing means adapted to selectively engage and disengage said upper foot member means, to selectively maintain said upper foot member means in its operative extended position when said bracing means is engaged therewith.

3. The folding carrier of claim 1, wherein said upper foot member means and said frame are disposed in substantially perpendicular relationship to one another when said upper foot member means is in its operative extended position, said upper foot member means and said frame being disposed in substantially parallel relationship to one another when said upper foot member means is disposed in its collapsed position.

4. The folding carrier of claim 3, wherein said upper foot member means has a pair of arms and a foot bar, pair of arms rotatably disposed on said frame, said pair of arms being adapted for rotatable movement in tandem with one another between their operative extended positions and their collapsed storage positions.

5. The folding carrier of claims 4, wherein said pair of arms and said foot bar form a substantially U-shaped member.

6. A folding carrier mountable on a motor vehicle, said carrier comprising:

a frame having a plurality of vehicle engagement members adapted to supportably engage the motor vehicle, said vehicle engagement members include a supporting member pivotally mounted to said frame and constrained for limited rotational movement relative thereto between an operative extended position and a collapsed storage position, a portion of said supporting member engaging said frame to prevent further movement relative to said frame when said supporting member is in its operative extended position, said supporting member and said frame being in substantially perpendicular relationship to one another when said supporting member is in its operative extended position, said supporting member and said frame being in a substantially parallel orientation when said supporting member is in its collapsed storage position, said supporting member being adapted to supportably engage the motor vehicle when said supporting member is in its operative extended position; and a cage rotatably and slidably disposed on said frame, said cage being selectively movable between an operative extended position and a collapsed storage position, said cage being adapted to supportably receive and restrain cargo placed therein when said cage is disposed in said operative extended position.

7. The folding carrier of claim 6, including arm means and a hook member, said arm means rotatably mounted to said frame, said hook member provided at an end of said arm means, said hook member being adapted to selectively engage an externally mounted spare tire.

8. The folding carrier of claim 7, wherein said arm means includes a pair of arms rotatably disposed on said frame and adapted for rotatable movement in tandem with one another between their operative extended positions and their collapsed storage positions, each said arm having a hook member at its free end.

9. A folding carrier mountable on a motor vehicle, said carrier comprising:

a frame;

a vehicle engagement means operatively connected to said frame, said vehicle engagement means including an upper member, said upper member being selectively movable about an axis between an operative extended position and a collapsed storage position, said upper member and said frame being disposed in substantially perpendicular relationship to one another when said upper member is in its operative extended position, said upper member and said frame being disposed substantially side-by-side relationship when said upper member is disposed in its collapsed position, said upper member having a pair of arms;

bracing means disposed on said frame and adapted to selectively engage and disengage said upper member to selectively maintain said upper member in its extended position; and a cage rotatably and slidably disposed on said frame, said cage being selectively movable between an operative extended position and a collapsed storage position, said cage having a platform member adapted for being disposed in a substantially perpendicular orientation relative to said frame when said cage is disposed in its operative extended position, said platform member adapted for being disposed in a substantially side-by-side relationship with said frame when said cage member is disposed in its collapsed position.

10. The folding carrier of claim 9, including a hook member disposed on a terminal end of said pair of arms.

11. A folding carrier mountable on a motor vehicle, said carrier comprising:

a frame;

a vehicle engagement means, said vehicle engagement means including an upper member, said upper member being selectively movable about an axis between an operative extended position and a collapsed storage position, said upper member and said frame being disposed in substantially perpendicular relationship to one another when said upper member is in its operative extended position, said upper member and said frame being disposed in a substantially side-by-side relationship when said upper member is disposed in its collapsed position, said upper member having a pair of arms;

a hook member disposed on a terminal end of each of said pair of arms;

bracing means disposed on said frame and adapted to selectively engage and disengage said upper member, said upper member being rigidly disposed in its extended position when said bracing means is engaged with said support member; and a cage rotatably and slidably disposed on said frame, said cage being selectively movable between an operative extended position and a collapsed storage position, said cage having a platform member adapted for being disposed in a substantially perpendicular orientation relative to said frame when said cage is disposed in its operative extended position, said platform member adapted for being disposed in a substantially side-by-side relationship with said frame when said cage member is disposed in its collapsed position.

12. The folding carrier of claim 11, wherein said vehicle engagement means includes a supporting member pivotably mounted to said frame and constrained for limited rotational movement relative thereto between an operative extended position and a collapsed storage position, a portion of said supporting member engaging said frame to prevent further movement relative to said frame when said supporting member is in its operative extended position, said upper member pivotally mounted to said supporting member, said supporting member and said frame being in substantially perpendicular relationship to one another when said supporting member is in its operative extended position, said supporting member and said frame being in a substantially side-by-side relationship when said supporting member is in its collapsed storage position, said supporting member being adapted to supportably engage the automobile when said supporting member is in its operative extended position.

13. The folding carrier of claim 12, wherein said cage includes a platform member adapted to be disposed in a substantially perpendicular orientation relative to said frame when said cage is disposed in said operative extended position, and in a substantially parallel orientation relative to said frame when said cage member is disposed in said collapsed position.

14. The folding carrier of claim 13, wherein said cage further includes a perimeter rail rotatably fastened to said frame and rotatably fastened to said second end of said platform member, said perimeter rail being disposed at an oblique angle relative to said frame when said cage is disposed in said operative extended position, and in substantially parallel orientation relative to said frame when said cage is disposed in said collapsed position, said perimeter rail restraining lateral movement of cargo placed in said cage.

* * * * *